United States Patent [19]

Kushmuk

[11] 4,134,213

[45] Jan. 16, 1979

[54] HEIGHT MEASURING DEVICE

[75] Inventor: Walter P. Kushmuk, Niles, Ill.

[73] Assignee: Continental Scale Corporation, Bridgeview, Ill.

[21] Appl. No.: 743,089

[22] Filed: Nov. 18, 1976

[51] Int. Cl.² .............................................. G01B 5/00
[52] U.S. Cl. ................................................. 33/169 R
[58] Field of Search ..................... 33/169 R, 161, 111

[56] References Cited

U.S. PATENT DOCUMENTS

| | | | |
|---|---|---|---|
| 776,897 | 12/1904 | Ferris | 33/111 |
| 1,371,281 | 3/1921 | Weber | 33/169 R |
| 1,996,553 | 4/1935 | Scully | 33/169 R |
| 2,125,530 | 8/1938 | Verdier | 33/169 R |

Primary Examiner—Richard E. Aegerter
Assistant Examiner—Willis Little
Attorney, Agent, or Firm—Richard L. Johnston

[57] ABSTRACT

A height measuring device useful for measuring the height of persons is provided having telescopically arranged measuring rods with faces containing parallel vertical columns of different types of height measuring units such as English height measuring units on the one hand, and metric height measuring units on the other.

2 Claims, 3 Drawing Figures

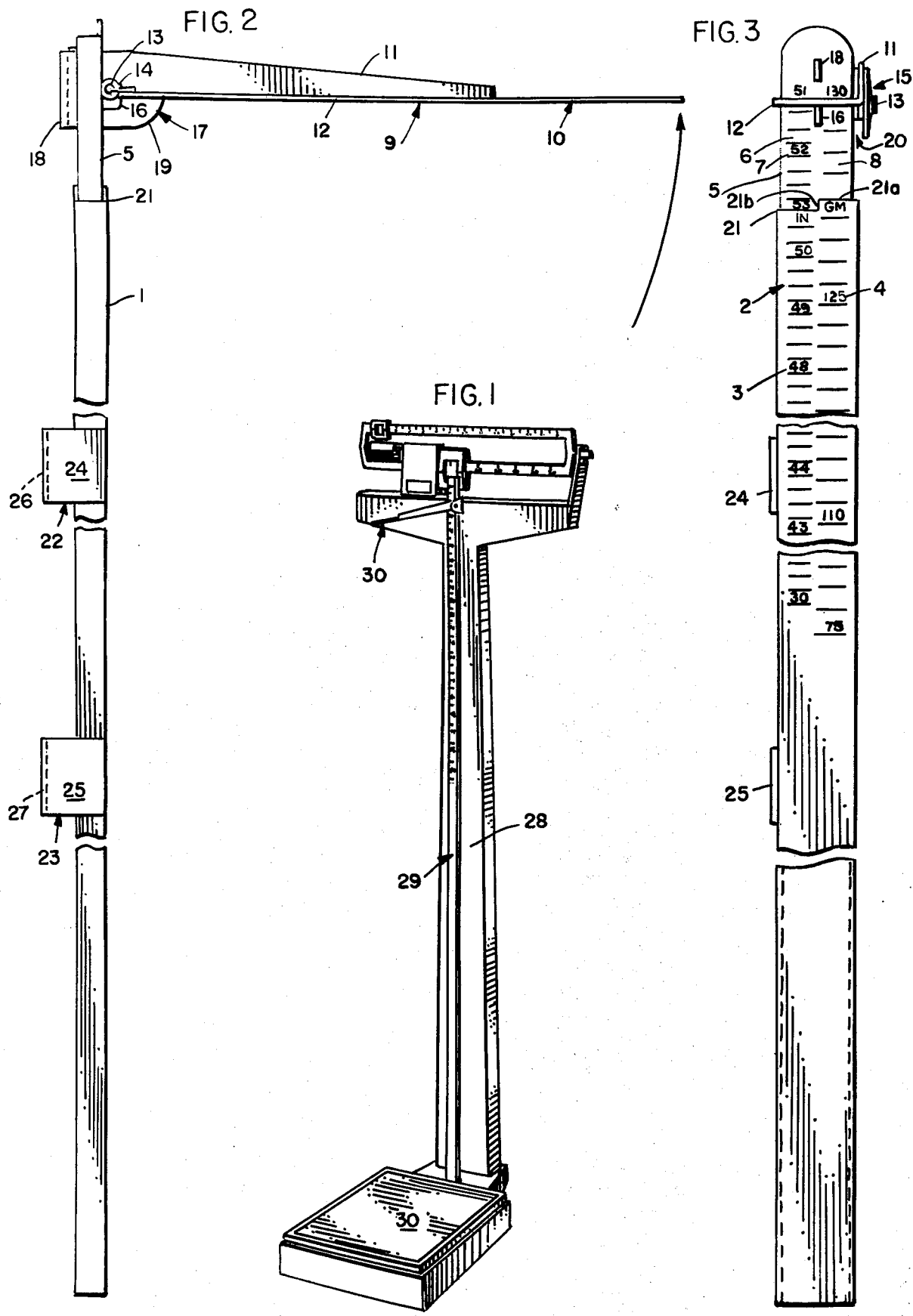

HEIGHT MEASURING DEVICE

BACKGROUND

It is well known in the art to provide measuring devices useful for measuring the height of persons wherein two measuring rods are telescopically arranged and a single column of measuring units is disposed on each of said rods. However, insofar as is known, no one has heretofore devised a height measuring device in which the height of persons can be measured in two different types of height measuring units such as English height measuring units, on the one hand, and metric height measuring units on the other.

OBJECTS

One of the objects of the present invention is to provide a height measuring device useful for measuring the height of persons wherein the height can be read either in English measuring units such as inches or in metric height measuring units such as centimeters.

Other objects and advantages will appear from the following description in conjunction with the accompanying drawing.

THE DRAWING

In the drawing:

FIG. 1 is a perspective view of a conventional type of beam weighing scale such as that ordinarily used in a physician's office wherein a height measuring device is mounted on the front of the scale support pillar;

FIG. 2 is a side view with parts broken away of a dual measuring unit-height measuring device illustrating a preferred embodiment of the invention; and FIG. 3 is a front elevational view with parts broken away of the height measuring device illustrated in FIG. 2.

BRIEF SUMMARY OF THE INVENTION

In accordance with the invention a height measuring device useful for measuring the height of persons is provided having telescopically arranged measuring rods with faces containing parallel vertical columns of different types of height measuring units such as English height measuring units on the one hand, and metric height measuring units on the other.

DETAILED DESCRIPTION OF THE INVENTION

The embodiment of the invention illustrated in the drawing comprises a fixed rod 1 having a face 2 sufficiently wide to accommodate two columns of numerals 3 and 4 arranged parallel to one another or in a side-to-side relationship. The column of numerals 3 consists of English height measuring units in inches vertically disposed on face 2 spaced apart in numerical sequence. The column of numerals 4 consists of metric height measuring units in centimeters vertically disposed on the face 2 spaced apart in numerical sequence.

A vertically movable rod 5 is telescopically mounted in the fixed rod 1 so as to be vertically slidable with respect to said fixed rod 1. The movable rod 5 has a face 6 which is sufficiently large to accommodate 2 columns of numerals 7 and 8 in side-to-side relationship, i.e., substantially parallel to one another. The column of measuring units 7 consists of English measuring units such as inches and the column of height mesuring units 8 consists of metric measuring units such as centimeters.

A headpiece generally shown at 9 comprises an elongated member 10 extending at right angles outwardly from the face 6 of movable rod 5 and also at right angles to the face 2 of fixed rod 1.

Headpiece 9 is L-shaped as shown in FIG. 3 and comprises a vertical portion 11 and a horizontal portion 12. The horizontal portion 12 extends beyond the vertical portion 11 as shown in FIG. 2.

The headpiece 9 pivots around a rivet 13 which is swaged at the outer end. A washer 14 is provided between the swaged end of the rivet and the mounting means for the headpiece which is generally shown at 15. The headpiece 9 pivots upwardly in the direction of the arrow from the horizontal to a vertical position and downwardly from a vertical position to a horizontal position. It also has a downwardly extending stop member 16, the inner end of which rests against the outer face of the movable rod 5 when the headpiece is in the horizontal position.

The mounting means 15 for the headpiece 9 comprises a U-shaped bracket 17, one leg of which 18 is affixed to movable rod 5 in any suitable manner, for example, by inserting it through an opening in movable rod 5 and swaging it. The opposite leg 19 of the U-shaped bracket 17 extends along the side of the fixed rod and is spaced therefrom by a space 20 which is sufficient to permit it to pass over the side of fixed rod 1 when the movable rod 5 is moved downwardly in telescopic association with the fixed rod 1. When the top of movable rod 5 passes below the top 21 of fixed rod 1, the underside of the horizontal portion 12 of the headpiece becomes an indexing member and from its position the height measurements either in inches or centimeters can be measured on the fixed rod 1 after the outer portion 10 of headpiece 9 is contacted with the head of a person whose height is to be measured. Normally the maximum height measured on the fixed rod 1 will be fifty inches or the corresponding number of centimeters. When the person whose height is to be measured is taller than fifty inches, the measurements are obtained by moving the movable rod 5 upwardly so that the mounting means 15 and the headpiece 9 are beyond the top 21 of fixed rod 1.

The numerals on the base of the movable rod 5 are arranged so as to increase numerically from top to bottom and as the movable rod 5 is raised with the portion 10 of headpiece 9 contacting the head of the person whose height is to be measured, the edge 21 of fixed rod 1 will be the index for determining the height measurements in inches and edge 21a will be the index for centimeters. The step 21b is necessary to round off the equivalent of 51 inches at 130 centimeters. Since 51 inches is equivalent to 129.54 centimeters, a step of 0.46 centimeters (0.18 inch) is necessary.

The height measuring scale previously described can be secured in any suitable manner with the fixed rod 1 and the telescopic rod 5 vertically disposed either to a wall or to the column of a beam scale as illustrated in FIG. 1. This can be accomplished by means of L-shaped brackets 22 and 23 each having a side 24 and 25, respectively, secured to a side of a fixed rod 1 and the connecting sides 26 and 27 fastened in any suitable manner either to a wall or to a column 28 of a beam scale as illustrated in FIG. 1. The beam scale illustrated in FIG. 1 is conventional and does not constitute a part of the invention except to the extent that it is adapted to be used in combination with a height measuring scale of the type herein described, the height measuring scale being generally indicated at 29. When the height measuring scale is used in combination with a beam scale as shown in FIG. 1 the height measurements are obtained in the usual manner by having a person stand on the platform 30 of the weighing scale and by adjusting the movable rod portion of the height measuring scale until the headpiece generally indicated at 9 is in contact with the top of the head of the person whose height is to be measured. The height measurements are then determined in the manner previously explained. For shorter persons whose height does not exceed fifty-one inches, the telescopic rod 5 is lowered until the mounting means 15 is over the outside of the fixed rod 1 whereby the underside of the horizontal portion 12 of the headpiece 9 adjacent the face of the fixed rod serves to index the height measurements on the columns of numerals on the face of the fixed rod 1.

For taller persons having a height greater than fifty-one inches or the corresponding number of centimeters, the movable rod 5 is moved vertically until the underside of headpiece 9 contacts the top of the head of the person whose height is to be measured. At this point the top 21 of fixed rod 1 serves as an index to indicate the height measurements either in inches or in centimeters.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A height measuring scale for measuring the height of persons in either English units of height measurement or metric units of height measurement or both which comprises a fixed rod, said fixed rod having a face sufficiently large to accommodate two columns of numerical indices in side-to-side relationship, a column of English height measuring units vertically disposed on said face spaced apart in numerical sequence, a column of metric height measuring units vertically disposed on said face spaced apart in numerical sequence in side-to-side relationhip with said column of English height measuring units, said fixed rod also having an upper stepped end with a step offset between the indices for English units and metric units having a height of 0.18 inch or 0.46 centimeter to compensate for and round off the difference between said units, a vertically movable rod telescopically mounted in said fixed rod so as to be vertically slidable with respect to said fixed rod, said movable rod having a face sufficiently large to accommodate two columns of numerals in side-to-side relationship, a column of English height measuring units vertically disposed on said face spaced apart in numerical sequence, a column of metric height measuring units vertically disposed on said face spaced apart in numerical sequence in side-to-side relationship with said column of English height measuring units, and a headpiece comprising an elongated member extending at right angles outwardly from said faces of said fixed rod and said movable rod, said headpiece being pivotally mounted to move from a vertical position to a horizontal position on mounting means fixed to said movable rod and slidable vertically over said fixed rod, said elongated member having a free outer end the under side of which is adapted to contact the head of a person whose height is to be measured when said member is in said horizontal position and an inner end having an under side which is transversely horizontal and rests against either said fixed rod or said movable rod when said member is in a horizontal position, said under side of said inner end serving to index the height measurments on the columns of numerals on said fixed rod, the inner end of said elongated member also being connected to position said movable rod vertically when its outer end is in contact with the head of a person whose height is to be measured and the upper stepped end of said fixed rod serving as indices for the height measurements on the columns of numerals on said movable rod.

2. A measuring scale as claimed in claim 1 in which said English height measuring units are in inches and said metric height measuring units are in centimeters.

* * * * *